US009258566B1

(12) United States Patent
Queru

(10) Patent No.: US 9,258,566 B1
(45) Date of Patent: Feb. 9, 2016

(54) SYSTEM AND METHOD OF SPHERICAL IMAGE COMPRESSION

(71) Applicant: Yahoo! Inc., Sunnyvale, CA (US)

(72) Inventor: Jean-Baptiste M. Queru, Foster City, CA (US)

(73) Assignee: YAHOO! INC., Sunnyvale, CA (US)

( * ) Notice: Subject to any disclaimer, the term of this patent is extended or adjusted under 35 U.S.C. 154(b) by 11 days.

(21) Appl. No.: 14/334,308

(22) Filed: Jul. 17, 2014

(51) Int. Cl.
*G06K 9/00* (2006.01)
*H04N 19/136* (2014.01)

(52) U.S. Cl.
CPC .................................. *H04N 19/136* (2014.11)

(58) Field of Classification Search
None
See application file for complete search history.

(56) References Cited

U.S. PATENT DOCUMENTS 5,289,289 A * 2/1994 Nagasaki ............... G06F 17/147
375/240.14
2006/0256113 A1* 11/2006 Grover ............... H04N 13/0055
345/427

OTHER PUBLICATIONS

Hoppe, Hugues, and Emil Praun. "Shape compression using spherical geometry images." Advances in Multiresolution for Geometric Modelling. Springer Berlin Heidelberg, 2005. 27-46.*
Praun, Emil, and Hugues Hoppe. "Spherical parametrization and remeshing." ACM Transactions on Graphics (TOG). vol. 22. No. 3. ACM, 2003.*
Ates, Hasan F., and Michael T. Orchard. "Spherical coding algorithm for wavelet image compression." Image Processing, IEEE Transactions on 18.5 (2009): 1015-1024.*
Laga, Hamid, Hiroki Takahashi, and Masayuki Nakajima. "Spherical wavelet descriptors for content-based 3D model retrieval." Shape Modeling and Applications, 2006. SMI 2006. IEEE International Conference on. IEEE, 2006.*

* cited by examiner

*Primary Examiner* — Hadi Akhavannik
(74) *Attorney, Agent, or Firm* — James J. DeCarlo; Greenberg Traurig, LLP

(57) ABSTRACT

Disclosed herein is a projection-aware compression, which may be used on image data such as, for example, spherical image data. The compression may be considered to be non-uniform in a sense that the compression need not be uniformly applied, but may be applied to image data as a function of latitude information associated with the image data.

27 Claims, 6 Drawing Sheets

SYSTEM AND METHOD OF SPHERICAL IMAGE COMPRESSION

FIELD OF THE DISCLOSURE

The present disclosure relates to image compression, and more particularly to compression of spherical images in a non-uniform manner.

BACKGROUND

One approach used for encoding a digital image is provided by Joint Photographic Experts Group (JPEG), which transforms the image from one form of information, e.g., spatial information, into another form, e.g., frequency information. The transformed data undergoes a quantization step before encoding to generate a compressed image. In the transformation operation, the image may be broken up into small squares of pixels, e.g., an 8×8 pixel square, with each square being input to a transform, e.g., a discrete cosine transform (DCT) or fast fourier transform (FFT), to generate a set of coefficients, e.g., a set of 64 coefficients, comprising both high frequency and low frequency coefficients. In quantization, a quantization matrix is applied to each square's set of coefficients, e.g., DCT coefficients, which may, depending on the quantization matrix used, result in some of the non-zero-valued coefficients being set to zero. Each quantization matrix may be considered to provide a corresponding image quality, and tradeoffs exist, e.g., a tradeoff between image quality and amount of storage space saved using a given quantization matrix. During encoding, or coding, the coefficients in each quantized matrix are converted to a stream of binary data, which may be further compressed using a compression algorithm, e.g., each run of zeroes and ones may be consolidated. Consequently, a quantization matrix that results in a greater number of zero coefficients may result in a greater amount of compression than a quantization matrix that results in fewer zeroed-out coefficients. However, the former quantization matrix may result in a less desirable picture quality than the latter.

SUMMARY

While digital image encoding, such as that provided by JPEG, provides a level of compression, embodiments of the present disclosure provide image compression in addition to that provided by JPEG, or other digital image encoding approaches. Embodiments of the present disclosure provide enhanced compression which may be used with an image that is projected onto a sphere at display time. Such enhanced compression results in less storage space being needed for an image. By way of a non-limiting example, the enhanced compression may be used to discard, or zero out, one or more coefficients, e.g., horizontal coefficients, based on associated latitude information. The compression need not be applied uniformly, and may be applied as a function of latitude information. The enhanced compression in accordance with embodiments of the present disclosure provides a level of compression in addition to compression preformed during quantization and encoding. Compression provided in accordance with embodiments of the present disclosure results in discarding unnecessary coefficient data results in greater level of compression during encoding.

The enhanced compression provided herein may be used to reduce the size of an image file, thereby reducing the resource(s), e.g., storage space, network bandwidth, etc., needed for the image file. While different levels of quantization may be used in the JPEG process to achieve varying degrees of compression, there are associated picture quality tradeoffs. Using the enhanced compression provided herein, a reduction in an image file's size is achieved without impacting picture quality. Additionally and with the enhanced compression provided with embodiments of the present disclosure, a storage savings results and a lower level of "JPEG compression" than might have otherwise been selected might be used, e.g., a quantization matrix having a corresponding smaller amount of compression might be selected, to achieve a higher picture quality.

Embodiments of the present disclosure may be used in connection with spherical images, such as a fully immersive panoramic picture, or photosphere, or other images such as those meant to be displayed as a sphere. One example of a spherical image is a panoramic image taken using a mobile phone or any other image capturing device. A panoramic image may comprise a number of individual images, which may be combined into a single picture with overlapping portions eliminated. The single image may then be stored as a single file, e.g., a JPEG file, which includes pixels that may provide a fully immersive panoramic picture, e.g., may include both the sky, the ground and areas in between.

By way of a non-limiting example, the image may be stored in a rectangular form, e.g., a rectangle twice as wide as tall, which may then be projected onto a sphere for display. In projecting onto a sphere using some type of projection, e.g., a Mercator projection, equirectangular projection, etc., parts of the projection, e.g., parts at or approaching the poles are stretched larger than parts close to the equator. Since pixels representing the image closer to a pole are squeezed together as the rectangle is projected onto the sphere, portions of the pixels stored in an image file, e.g., a JPEG file, contribute little, if any, impact to the spherical image, and are consequently not necessary. Embodiments of the present disclosure provide enhanced compression over that typically provided, e.g., compression performed in quantization and encoding performed with a JPEG image file, by discarding identified data, e.g., coefficient data associated with pixels at or approaching a pole that are squeezed together during a projection onto a sphere.

In accordance with one or more embodiments, a method is provided, the method comprising identifying, by at least one processor, a block of coefficients of a plurality of coefficient blocks generated from a plurality of pixels of a spherical image, the block of coefficients corresponding to a block of pixels of the plurality of pixels and comprising a set of horizontal frequency coefficients; determining, by the at least one processor, a latitude associated with the set of horizontal frequency coefficients, the set of coefficients representing varying levels of horizontal detail; and using, by the at least one processor, the associated latitude to make a determination whether to discard one or more of the coefficients of the block, an identification of a number of coefficients to discard is a function of the associated latitude such that the number increases as the associated latitude's approaches the pole.

In accordance with one or more embodiments a system is provided, which system comprises at least one computing device comprising one or more processors to execute and memory to store instructions to identify a block of coefficients of a plurality of coefficient blocks generated from a plurality of pixels of a spherical image, the block of coefficients corresponding to a block of pixels of the plurality of pixels and comprising a set of horizontal frequency coefficients; determine a latitude associated with the set of horizontal frequency coefficients, the set of coefficients representing varying levels of horizontal detail; and use the associated latitude to make a determination whether to discard one or more of the coefficients of the block, an identification of a number of coefficients to discard is a function of the associated latitude such that the number increases as the associated latitude's approaches the pole.

In accordance with yet another aspect of the disclosure, a computer readable non-transitory storage medium is provided, the medium for tangibly storing thereon computer readable instructions that when executed cause at least one processor to identify a block of coefficients of a plurality of coefficient blocks generated from a plurality of pixels of a spherical image, the block of coefficients corresponding to a block of pixels of the plurality of pixels and comprising a set of horizontal frequency coefficients; determine a latitude associated with the set of horizontal frequency coefficients, the set of coefficients representing varying levels of horizontal detail; and use the associated latitude to make a determination whether to discard one or more of the coefficients of the block, an identification of a number of coefficients to discard is a function of the associated latitude such that the number increases as the associated latitude's approaches the pole.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code to implement functionality in accordance with one or more such embodiments is embodied in, by and/or on a computer-readable medium.

DRAWINGS

The above-mentioned features and objects of the present disclosure will become more apparent with reference to the following description taken in conjunction with the accompanying drawings wherein like reference numerals denote like elements and in which:

FIG. 1 provides an illustration of components for use in accordance with one or more embodiments of the present disclosure.

FIG. 2, which comprises FIGS. 2A and 2B, provides coefficient block examples for use in accordance with one or more embodiments of the present disclosure.

FIG. 3 provides an example of associated latitudes in a rectangular projection of a spherical image in accordance with one or more embodiments of the present disclosure.

FIG. 4 provides an example of a process flow in accordance with one or more embodiments of the present disclosure.

DETAILED DESCRIPTION

Figure 1:
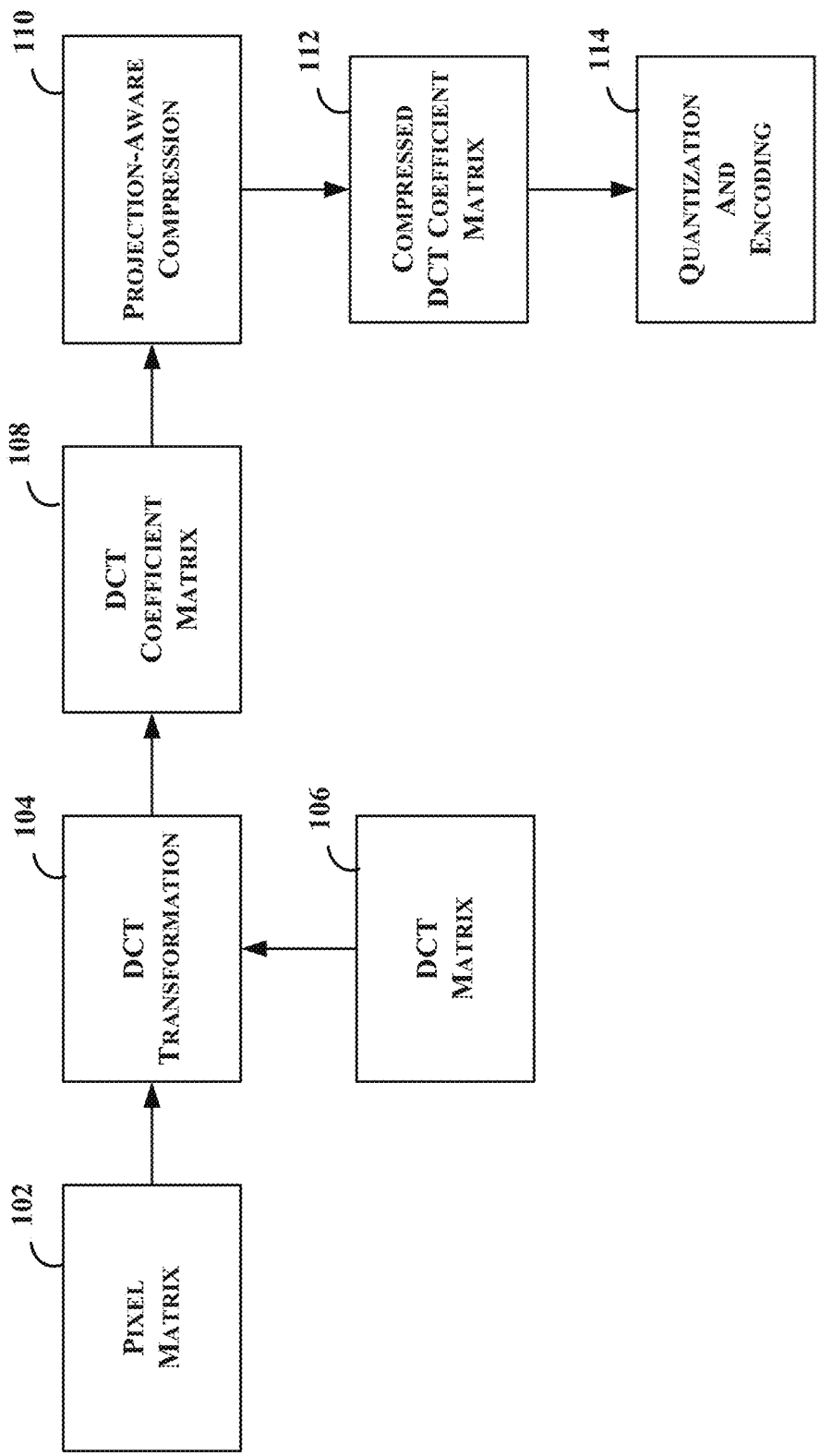

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The detailed description provided herein is not intended as an extensive or detailed discussion of known concepts, and as such, details that are known generally to those of ordinary skill in the relevant art may have been omitted or may be handled in summary fashion. Certain embodiments of the present disclosure will now be discussed with reference to the aforementioned figures, wherein like reference numerals refer to like components.

In general, the present disclosure includes a spherical image compression system, method and architecture. In accordance with one or more embodiments, a non-uniform projection-aware spherical image compression is provided. By way of a non-limiting example, a spherical image might be a fully immersed panoramic picture, or photosphere, that is stored as a rectangular image and which is projected onto a sphere for display. Such a projection causes distortion of the image, such that in some areas of the sphere, e.g., areas approaching the sphere's poles, details of the image are lost. Since the projection results in a loss of detail, such detail need not be retained in the stored image, e.g., a stored rectangular image from which the spherical image display is generated. Embodiments of the present disclosure remove the unneeded detail as further compression of the image data. The image data compression provided in accordance with one or more embodiments of the present disclosure may be provided alone or in addition to compression provided by a digital image file creation mechanism, such as and without limitation that provided by the JPEG method.

FIG. 1 provides an illustration of components for use in accordance with one or more embodiments of the present disclosure. In the example shown in FIG. 1, a projection-aware compression component 110 is included in an image file creation process such as that provided by the JPEG process. While embodiments of the present disclosure are described in connection with JPEG digital image encoding, it should be apparent that any other digital image encoding may be used with embodiments. Furthermore and while embodiments are disclosed in connection with a rectangular projection such as equirectangular projection, it should be apparent that any other projection may be used.

A digital image comprises a plurality of pixels, or physically addressable points in the image. Each pixel may identify one or more intensity components, e.g., a grayscale image may have a single intensity components while a color image may have multiple intensity components, such as red green and blue intensity components or cyan, magenta, yellow and black intensity components.

In accordance with one or more embodiments, a pixel may be associated with a latitude and/or longitude. A latitude, or parallel, is a geographic coordinate that indicates the north-south position, e.g., a point on the Earth's surface, which is typically designated in degrees. By way of some non-limiting examples, a latitude of 0°, or zero degrees, corresponds to the Earth's equator, which is equidistant from the north and south poles, and the Earth's north and south poles correspond to latitudes 90° and −90°, respectively. A pixel may also be associated with a longitude, or meridian, which runs perpendicular to each latitude, and is a geographic coordinate that specifies the north-south position of a point on the Earth's surface. Latitude and longitude may be used to identify a point on any sphere, including the Earth.

Multiple steps may be performed to generate a digital image from input image data comprising a plurality of pixels. By way of some non-limiting examples, such steps may comprise a transformation step, a quantization step and an encoding step. By way of a non-limiting example, the JPEG process uses a digital cosine transform (DCT) in the transformation step and a compression scheme such as lossy compression in the encoding step. Additionally, the JPEG process has a number of quantization matrices, each of which is designed to provide a different picture quality and corresponding level of compression. FIG. 1 illustrates some components that may be used with a position-aware compression component provided in accordance with one or more embodiments of the present disclosure. A number of pixels from a digital image may be processed together in a matrix, such as pixel matrix 102 shown in the example of FIG. 1. In the example, pixel matrix 102 comprises n rows and n columns to form an n by n matrix of pixels, where n may be any number, such as and without limitation 8.

Pixel matrix 102 is input to a transformation component 104. In the example shown in FIG. 1, the transformation component 104 comprises a DCT transform, which may use a DCT matrix 106 or other mechanism, to generate a set of DCT coefficients 108. Transformation component 104 may implement any type of transformation, including DCT, Fast Fourier Transform (FFT), etc. Component 104, in effect, may transform pixel data from spatial data into frequency data comprising horizontal and vertical frequencies and an average of the frequencies. By way of a non-limiting example, an 8 by 8 pixel matrix may be transformed into an 8 by 8 matrix of DCT frequency coefficients, or DCT coefficients, one of which is referred to as the DC coefficient and is an average computed from the remaining 63 coefficients referred to as an AC coefficients.

Figure 2A:
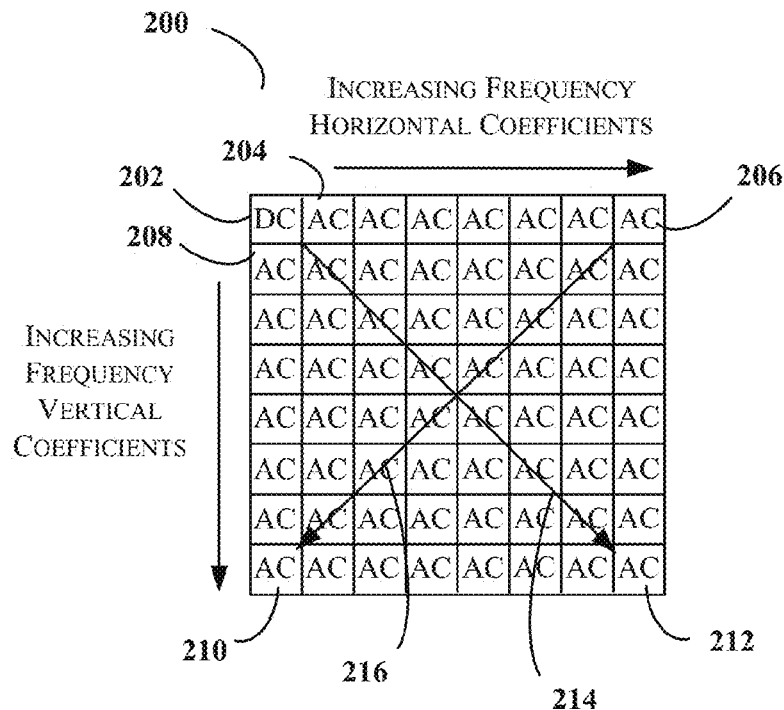

FIG. 2A provides an example of a coefficient block for use in accordance with one or more embodiments of the present disclosure. DCT coefficient matrix 200 comprises 64 coefficients, of which coefficient 202 is the DC coefficient. DCT coefficient matrix 200 might be generated from an 8 by 8 pixel matrix, for example. In the example shown in FIG. 2A, each column to the right of the column containing coefficient 202 represents a horizontal frequency, such that AC coefficient 204 located to the right and next to the DC coefficient 202 represents a smaller horizontal frequency than the AC coefficients located to its right and AC coefficient 206 represents a larger horizontal frequency than the AC coefficients located to its left. Similarly, each row of the matrix 200 below DC coefficient 202 represents a vertical frequency, such that AC coefficient 208 located just below the DC coefficient 202 represents a smaller vertical frequency than the AC coefficients located below it, and AC coefficient 210 represents a larger vertical frequency than the AC coefficients located above it. By way of some further non-limiting examples, arrow 214 illustrates increasing horizontal frequencies and increasing vertical frequencies, or in the opposite direction represents decreasing horizontal frequencies and decreasing vertical frequencies; and arrow 216 illustrates decreasing horizontal frequencies and increasing vertical frequencies, or in the opposite direction illustrates increasing horizontal frequencies and decreasing vertical frequencies.

A lower frequency coefficient may represent a gradual change in color, or intensity, in a region of pixels, while a higher frequency coefficient may represent a more rapid change in color, or intensity, in a region of pixels. Since the human eye is less sensitive to distortion occurring at the higher frequencies, e.g., where pixel intensities are rapidly changing, than to distortion occurring at lower frequencies, e.g., where pixel intensities are fairly stabilized, a conventional process, such as JPEG, focuses on minimizing distortion at the lower frequencies. Conventional approaches, such as JPEG, retain coefficient data that is not needed to generate a spherical image. Advantageously, embodiments of the present disclosure identify and discard such unnecessary coefficient data. In so doing, it is possible to provide a level of compression in addition to that provided by a conventional approach.

In accordance with one or more embodiments, coefficient data, e.g., horizontal frequency coefficient data, may be discarded based on latitude information associated with pixel data, e.g., the pixel matrix 102 used to generate DCT coefficient matrix 108, or DCT coefficient matrix 200 of FIG. 2A. Referring again to FIG. 1, DCT coefficient matrix 108 is input to a projection-aware compression module, or component, 110. Briefly and as is described in more detail below, embodiments of the present disclosure compress the coefficient data for images that are to be projected onto a sphere for display in a non-uniform manner by discarding a number of coefficients as a function of latitude, e.g., latitude information associated with a block of pixels, e.g., pixel matrix 102, used to generate the DCT coefficients, e.g., DCT coefficients of matrix 108 or coefficient matrix 200. By way of a non-limiting example, each discarded coefficient may be set to zero.

As shown in the example of FIG. 1, a compressed DCT coefficient matrix 112 becomes input to a quantization and encoding module 114. By way of a non-limiting example, quantization may apply a quantization matrix to the compressed DCT coefficient matrix 112 to generate a quantized DCT coefficient matrix, which becomes input to an encoder, which represents the coefficients in the quantized DCT coefficient matrix as a stream of zeroes and ones. During encoding, the stream may be compressed using a compression scheme such as a lossy or lossless compression scheme. A quantization matrix may be selected from multiple quantization matrices, each of which has an associated image quality and level of compression. Typically, as image quality is increased, the amount of compression decreases, and vice a versa. When selecting a quantization matrix, there is usually a trade-off between image quality and level of compression, the latter of which impacts the size of the resulting image file and storage space needed to store the image file.

For purposes of encoding, a zigzag approach may be used in determining an order of the coefficients in a coefficient matrix, e.g., matrix 108 or matrix 200, for generating the stream of the coefficients, which are represented as binary data. The zigzag approach identifies a streaming sequence of the coefficients in which the DC component is first, followed by the AC coefficients in order of increasing frequency, e.g., the lower-frequency AC coefficients, e.g., AC coefficients located toward the top and left of matrix 200, are followed by the higher-frequency AC coefficients, e.g., AC coefficients located toward the bottom and right of matrix 200. In the example shown in FIG. 2B, the numbers in each cell indicate a streaming order. In the example streaming order, DC coefficient 202 is followed by AC coefficient 204 and then AC coefficient 208, and AC coefficient 212 is the last coefficient in the steam.

Using a run length compression encoding approach, greater compression is achieved with longer runs, or bit repetitions. By way of a non-limiting example, a run of zeroes may be replaced by a single zero and a value representing the number of zeroes in the run. Coefficients discarded by the projection-aware compression component 110 in accordance with one or more embodiments of the present disclosure may be set to zero, which increases the potential for longer runs and a greater level of compression during encoding.

In the example shown in FIG. 1, compression component 110 is positioned after DCT transformation 102. In accordance with one or more embodiments, compression module may be performed before or as part of DCT transformation 104. In so doing, computation of some or all of the discarded coefficients may be avoided. In accordance with one or more such embodiments, computation of coefficients for DCT coefficient matrix 108 by DCT transformation 104 may be a function of latitude information associated with pixel matrix 102. By way of a non-limiting example, module 110 may identify those coefficients that are to be computed by DCT transformation module 104 using latitude information associated with pixel matrix 102; such that only DCT coefficient data that is needed is computed and DCT coefficient data that would be discarded if computed is not computed.

Figure 3:
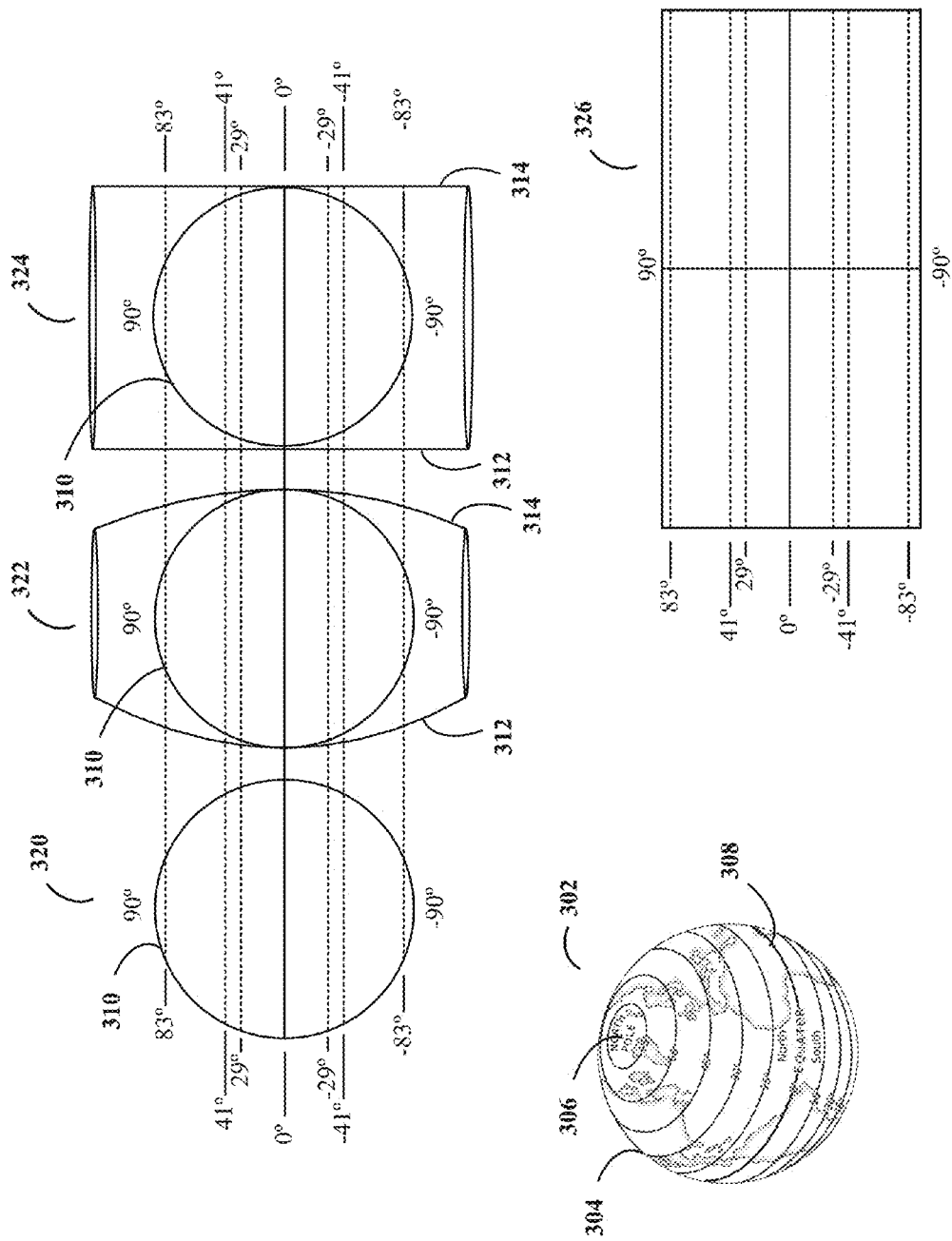

FIG. 3 provides an example of associated latitudes in a rectangular projection of a spherical image in accordance with one or more embodiments of the present disclosure. An example 302 of a sphere 304 representing the Earth and shows the North Pole 306 as well as a number of latitudes, including a latitude 306 corresponding to the equator at 0°. Example 320 provides another example of a sphere 310 depicting north and south poles designated by 90° and −90°, respectively, as well as 0°, ±29°, ±41° and ±83° latitudes.

Sphere 310 may correspond to any spherical image, e.g. a digital image displayed as a sphere. The spherical image may be stored in a rectangular form 326. A rectangular projection, equirectangular projection, Mercator projection, etc., may be used to convert the rectangular form 326 to a spherical form, such as that shown by sphere 310, and vice a versa. Examples 322 and 324 illustrate stages of a rectangular projection. During rectangular projection from sphere 310 to rectangle 326, the spherical image may be stretched, as shown in examples 322 and 324, to generate a cylinder such as that shown in example 324, which is then used to generate the rectangular form 326. In the opposite direction, from rectangular form 326 to sphere 310, rectangular form 326 is used to form a cylinder such as in example 324, and a portion of the spherical image stretched to generate the cylinder is now squeezed together, or compacted, to form the sphere, e.g., sphere 310. It is not necessary to retain the same level of detail for the portions of the image that are squeezed together as for the other portions of the image; yet, a conventional approach stores the same level of detail regardless of which portions of rectangular image 326 will be squeezed together to generate a spherical image.

Embodiments of the present disclosure recognize that less image data is needed for pixels located closer to each pole than is needed for pixels further from each pole. This is due to the compaction of the pixels in generating a spherical image from the rectangular form 326, for example. Accordingly and in at least one embodiment, image data may be compressed based on latitude, such that less detail is retained for, and a greater degree of compression may be applied to, that portion of the image data that is closer to each pole, or conversely more detail is retained for, and a lesser degree of compression may be applied to, that portion of the image data that is further from each pole. In accordance with one or more embodiments, a level of detail retained, or discarded, may be a function of associated latitude information.

By way of a non-limiting example, little, if any, compression may be used in a range defined by latitude 0° and ±29° latitudes, some amount of compression may be used in a range defined by 29° and 41° latitudes and a range defined by −29° and −41° latitudes, additional compression may be used in a range defined by 41° and 83° latitudes and a range defined by −41° and −83° latitudes, and a greatest amount of compression may be used beyond 83° and −83° latitudes. Of course, it should be apparent that fewer, additional and/or different ranges may be used in accordance with one or more embodiments of the present disclosure; and latitude thresholds other than ±29°, ±41° and ±83° latitudes may be used to define one or more ranges.

Convention approaches fail to take into account latitude information in determining a level of compression. Consequently, such approaches result in storing more image data than needed. Conventional approaches use a uniform compression scheme without regard to whether an image is to be projected onto a sphere for display and/or without regard to latitude information. In contrast to conventional approaches, embodiments of the present disclosure discard image detail, e.g., high-frequency horizontal data, as a function of latitude information associated with the image data, e.g., latitude information associated with pixels in a pixel matrix used to generate DCT coefficients.

Figure 4:
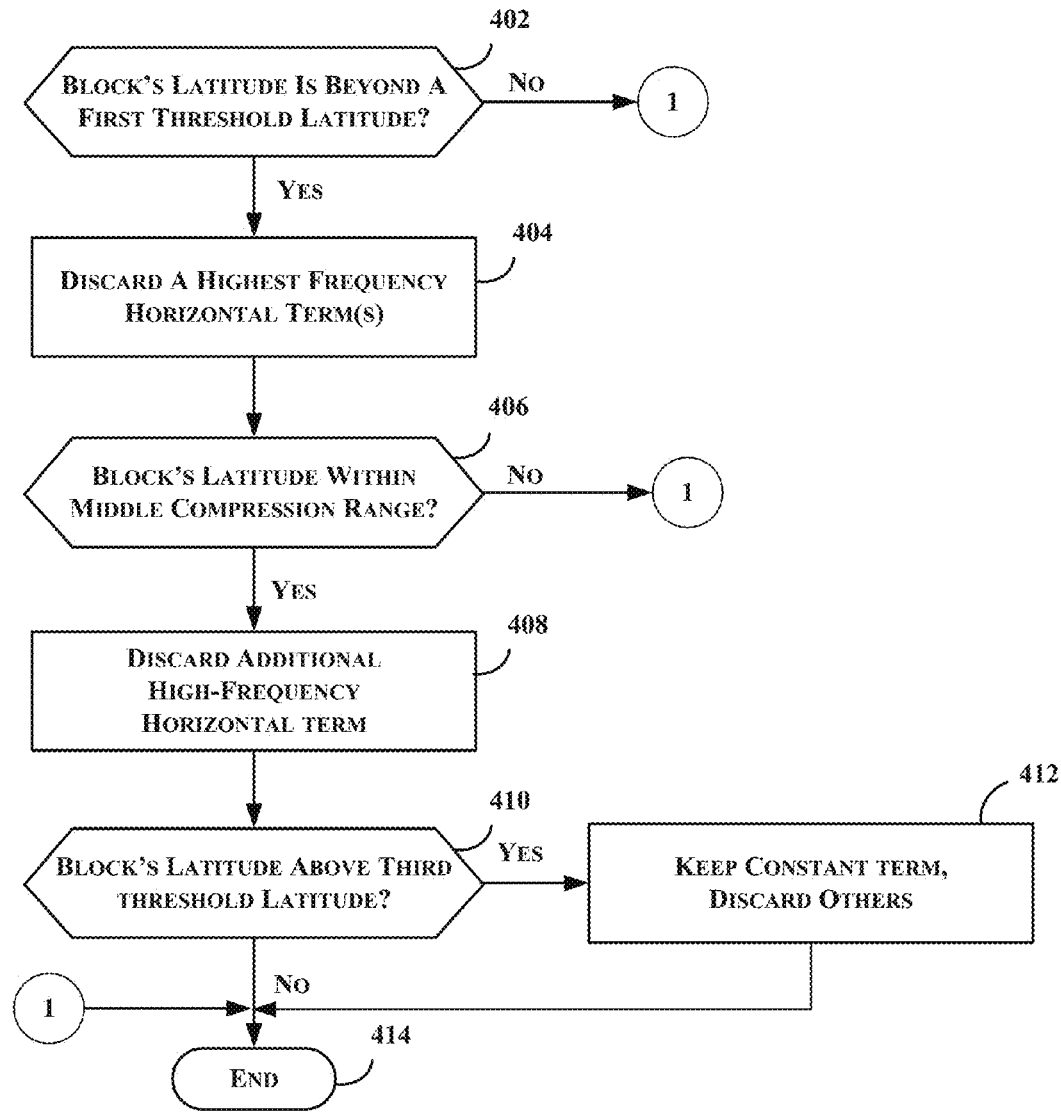

FIG. 4 provides an example of a process flow in accordance with one or more embodiments of the present disclosure. The process flow shown in the example of FIG. 4 may be performed for each DCT coefficient matrix 108 generated using pixel data of an image. In the example shown in FIG. 4, a first latitude range is defined by first and second threshold latitudes, such as and without limitation 29° and 41° (respectively) or −29° and −41° (respectively); a second latitude range is defined by second and third threshold latitudes, such as and without limitation 41° and 83° (respectively) or −41° and −83° (respectively). Of course and as is discussed above, it should be apparent that fewer, additional and/or different ranges may be used in accordance with one or more embodiments of the present disclosure; and latitude thresholds other than ±29°, ±41° and ±83° latitudes may be used to define one or more ranges.

At step 402, a determination is made whether or not to perform any compression based on latitude. By way of a non-limiting example, the determination may be based on whether a latitude associated with the DCT coefficient matrix 108 is beyond a first threshold latitude, e.g., 29° or −29°. If it is determined, at step 402, that the latitude associated with the DCT coefficient matrix 108 is not beyond the first threshold latitude for performing compression, processing ends, at step 414, for the DCT coefficient matrix 108.

Figure 2B:
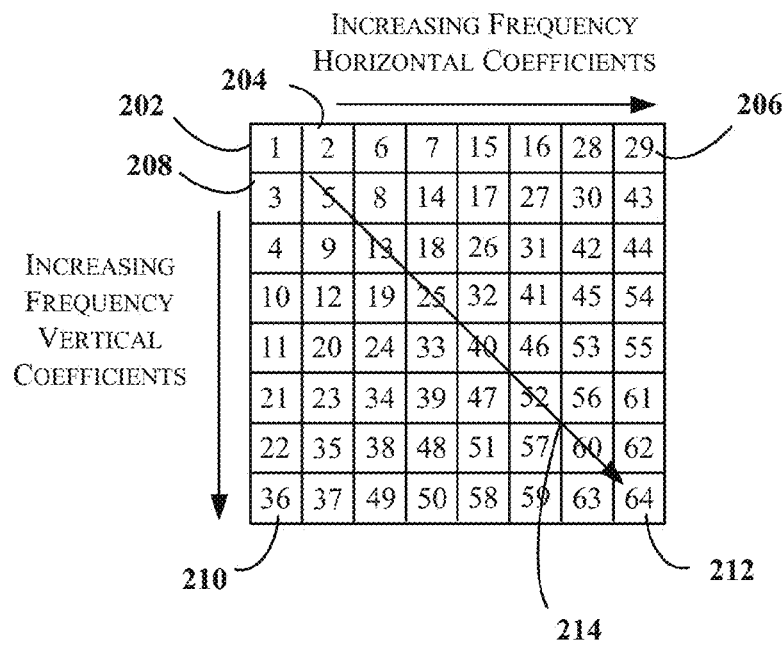

If it is determined, at step 402, that the associated latitude is beyond the first threshold latitude, processing continues at step 404 to discard at least one highest frequency horizontal term. By way of a non-limiting example, for a DCT coefficient matrix, e.g., matrix 108 of FIG. 1, having an associated latitude higher than 29°, one or more AC coefficients with the highest-frequency horizontal detail may be discarded. With reference to FIG. 2B and assuming that the AC coefficient numbered 16 is the highest non-zero horizontal frequency, the value associated with the AC coefficient may be discarded, e.g., set to zero. Additionally and in accordance with one or more embodiments, any non-zero AC coefficient(s) in that same column might be discarded, e.g. set to zero. A similar determination may be made, at step 402, in connection with −29° latitude to determine whether or not to discard at least one term at step 404 based on the associated latitude.

Processing continues at step 406 to determine whether or not the associated latitude is within a middle compression range, which range may be defined by the first threshold latitude and a second threshold latitude. If not, processing ends at step 414. By way of a non-limiting example, the first and second threshold latitudes may be 29° and 41° (respectively) or −29° and −41° (respectively). By way of a further non-limiting example, for a DCT coefficient matrix, e.g., matrix 108 of FIG. 1, having an associated latitude between 29° and 41°, an additional AC coefficient may be discarded at step 408. By way of a non-limiting example, the additional AC coefficient data may comprise an AC coefficient that is in addition to any AC coefficient(s) already discarded at step 404. With reference to FIG. 2B and assuming that the AC coefficient numbered 16 was previously discarded, a next highest-frequency coefficient may be discarded, e.g., the AC coefficient numbered 15, where such AC coefficient has a non-zero value. Additionally and in accordance with one or more embodiments, any non-zero AC coefficient(s) in the same column might be discarded, e.g., set to zero. A similar determination may be made, at step 406, in connection with a latitude range of −29° and −41 to determine whether or not to discard additional coefficient data at step 408 based on the associated latitude.

Processing continues at step 410 to determine whether or not the associated latitude is beyond a third threshold latitude. If not, processing ends at step 414. By way of an additional non-limiting example, for a DCT coefficient matrix, e.g., matrix 108 of FIG. 1, has an associated latitude beyond 83°, only the DC coefficient, e.g., coefficient 202 of FIG. 2A, is retained and each of the AC coefficients are discarded, e.g., set to zero, at step 412. A similar determination may be made, at step 410 in connection with a −83° latitude threshold to determine whether or not to discard the AC coefficients at step 412 based on the associated latitude. Processing ends at step 414.

In accordance with one or more embodiments, a percentage, e.g., 21%, of DCT coefficients in an image file, e.g., a JPEG image file may be discarded, where the 29% may be estimated as1-pi/4, or 1−0.97=0.21.

Figure 5:
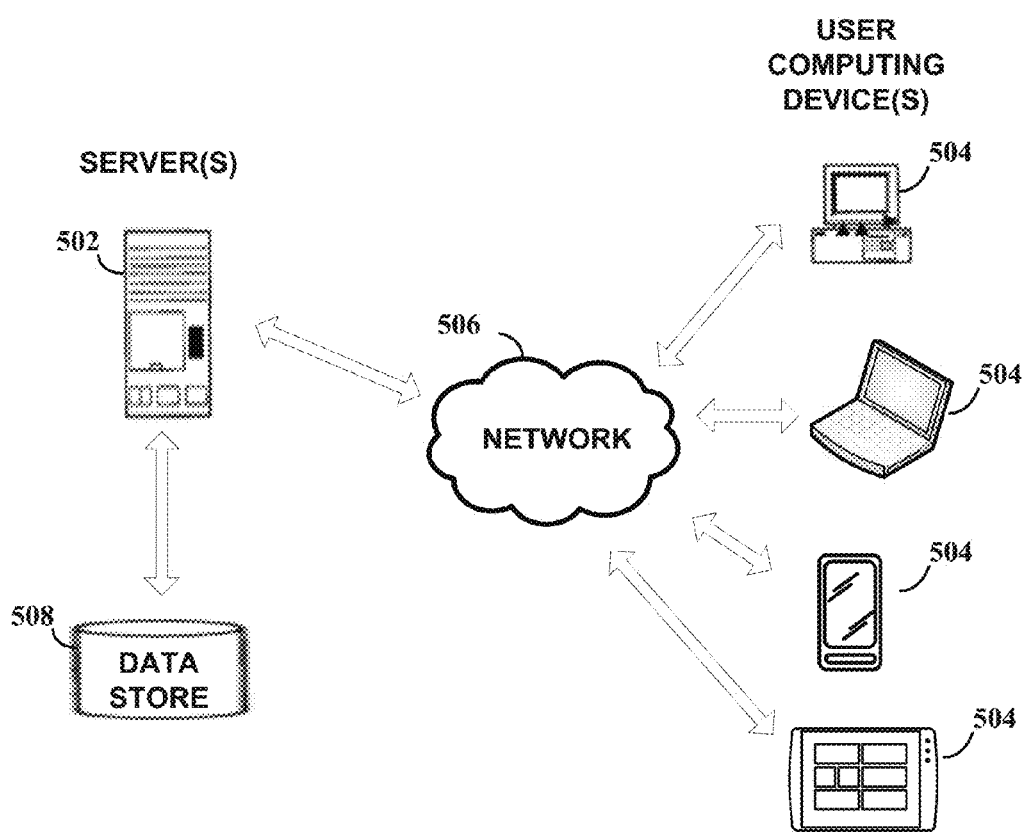
FIG. 5 illustrates some components that can be used in connection with one or more embodiments of the present disclosure.

FIG. 5 illustrates some components that can be used in connection with one or more embodiments of the present disclosure. In accordance with one or more embodiments of the present disclosure, one or more computing devices, e.g., one or more servers, user devices or other computing device, are configured to comprise functionality described herein. For example, a computing device 502 and/or 504 can be configured to execute program code, instructions, etc. to provide functionality in accordance with one or more embodiments of the present disclosure.

Computing device 502 can serve content to user computing devices 504 using a browser application via a network 506. Data store 508 can be used to store program code to configure a server 502 to functionality in accordance with one or more embodiments of the present disclosure.

The user computing device 504 can be any computing device, including without limitation a personal computer, personal digital assistant (PDA), wireless device, cell phone, internet appliance, media player, home theater system, and media center, or the like. For the purposes of this disclosure a computing device includes a processor and memory for storing and executing program code, data and software, and may be provided with an operating system that allows the execution of software applications in order to manipulate data. A computing device such as server 502 and the user computing device 504 can include one or more processors, memory, a removable media reader, network interface, display and interface, and one or more input devices, e.g., keyboard, keypad, mouse, etc. and input device interface, for example. One skilled in the art will recognize that server 502 and user computing device 504 may be configured in many different ways and implemented using many different combinations of hardware, software, or firmware.

In accordance with one or more embodiments, a computing device 502 can make a user interface available to a user computing device 504 via the network 506. The user interface made available to the user computing device 504 can include content items, or identifiers (e.g., URLs) selected for the user interface in accordance with one or more embodiments of the present invention. In accordance with one or more embodiments, computing device 502 makes a user interface available to a user computing device 504 by communicating a definition of the user interface to the user computing device 504 via the network 506. The user interface definition can be specified using any of a number of languages, including without limitation a markup language such as Hypertext Markup Language, scripts, applets and the like. The user interface definition can be processed by an application executing on the user computing device 504, such as a browser application, to output the user interface on a display coupled, e.g., a display directly or indirectly connected, to the user computing device 504.

In an embodiment the network 506 may be the Internet, an intranet (a private version of the Internet), or any other type of network. An intranet is a computer network allowing data transfer between computing devices on the network. Such a network may comprise personal computers, mainframes, servers, network-enabled hard drives, and any other computing device capable of connecting to other computing devices via an intranet. An intranet uses the same Internet protocol suit as the Internet. Two of the most important elements in the suit are the transmission control protocol (TCP) and the Internet protocol (IP).

As discussed, a network may couple devices so that communications may be exchanged, such as between a server computing device and a client computing device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs. A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example. For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

It should be apparent that embodiments of the present disclosure can be implemented in a client-server environment such as that shown in FIG. 5. Alternatively, embodiments of the present disclosure can be implemented with other environments. As one non-limiting example, a peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Figure 6:
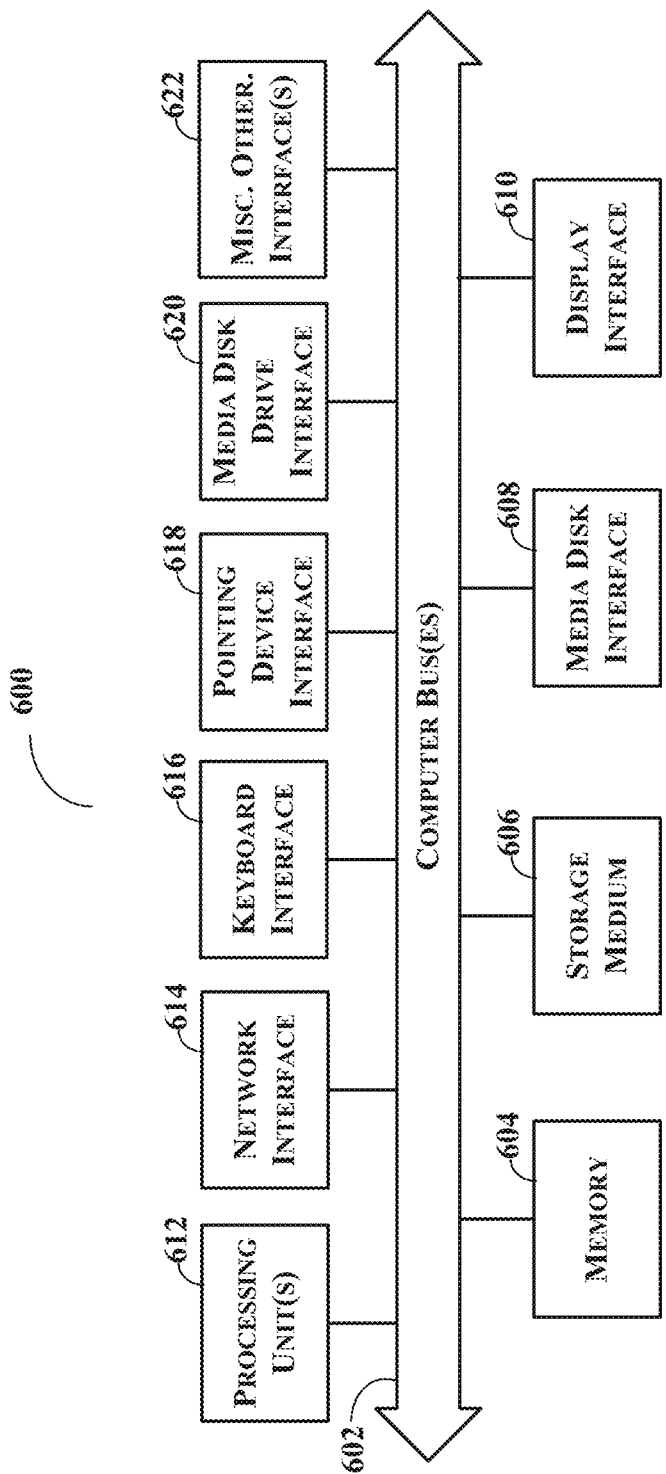
FIG. 6 is a detailed block diagram illustrating an internal architecture of a computing device in accordance with one or more embodiments of the present disclosure.

FIG. 6 is a detailed block diagram illustrating an internal architecture of a computing device, e.g., a computing device such as server 502 or user computing device 504, in accordance with one or more embodiments of the present disclosure. As shown in FIG. 6, internal architecture 600 includes one or more processing units, processors, or processing cores, (also referred to herein as CPUs) 612, which interface with at least one computer bus 602. Also interfacing with computer bus 602 are computer-readable medium, or media, 606, network interface 614, memory 604, e.g., random access memory (RAM), run-time transient memory, read only memory (ROM), etc., media disk drive interface 620 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, computer-readable storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

Persistent storage, e.g., medium/media 606, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

The invention claimed is:

1. A method comprising:
    identifying, by at least one processor, a block of coefficients of a plurality of coefficient blocks generated from a plurality of pixels of a spherical image, the block of coefficients corresponding to a block of pixels of the plurality of pixels and comprising a set of horizontal frequency coefficients;
    determining, by the at least one processor, a latitude associated with the set of horizontal frequency coefficients, the set of coefficients representing varying levels of horizontal detail; and
    using, by the at least one processor, the associated latitude to make a determination whether to discard one or more of the coefficients of the block, an identification of a number of coefficients to discard is a function of the associated latitude such that the number increases as the associated latitude's approaches the pole.

2. The method of claim 1, the using the associated latitude to make a determination whether or not to discard one or more of the coefficients further comprising:
    discarding a first coefficient representing a highest-frequency horizontal detail from the set of horizontal frequency coefficients of the block of coefficients where the determination is made that the associated latitude is beyond a first threshold latitude defined by first and second threshold latitudes;
    discarding a second coefficient in addition to the first coefficient from the set of horizontal frequency coefficients where the determination is made that the associated latitude is within a latitude range defined by the first threshold latitude and a second threshold latitude; and
    discarding the set of horizontal frequency coefficients where the determination is made that the associated latitude is beyond a third threshold latitude.

3. The method of claim 2, the third threshold latitude is closer to the pole than the first and second threshold latitudes and the first threshold latitude is the furthest from the pole relative to the second and third threshold latitudes.

4. The method of claim 2, further comprising:
    preserving, by at least one processor, a constant coefficient in the block coefficients, the constant coefficient representing an average determined using each coefficient in the block of coefficients generated by the transformation of the block of pixels.

5. The method of claim 4, the discarding the set of horizontal frequency coefficients where the determination is made that the associated latitude is beyond the third threshold latitude further comprising:
    discarding each coefficient of the block of coefficients except the constant coefficient.

6. The method of claim 1, further comprising:
    providing, by the at least one processor, the block of coefficients comprising the set of horizontal frequency coefficients to one or more of quantization and encoding of the block of coefficients, any coefficient discarded from the set of horizontal coefficients being set to zero in the block of coefficients.

7. The method of claim 1, the using is performed prior to performing a transformation of the block of pixels to generate the block of coefficients, such that the transformation comprises transformation of coefficients other than discarded coefficients.

8. The method of claim 1, the using is performed after performing the transformation of the block of pixels to generate the block of coefficients.

9. The method of claim 1, the spherical image comprising an image that is to be projected onto a sphere using a rectangular projection.

10. A system comprising:
    at least one computing device comprising one or more processors to execute and memory to store instructions to:
        identify a block of coefficients of a plurality of coefficient blocks generated from a plurality of pixels of a spherical image, the block of coefficients corresponding to a block of pixels of the plurality of pixels and comprising a set of horizontal frequency coefficients;
        determine a latitude associated with the set of horizontal frequency coefficients, the set of coefficients representing varying levels of horizontal detail; and use the associated latitude to make a determination whether to discard one or more of the coefficients of the block, an identification of a number of coefficients to discard is a function of the associated latitude such that the number increases as the associated latitude's approaches the pole.

11. The system of claim 10, the instructions to use the associated latitude to make a determination whether or not to discard one or more of the coefficients further comprising instructions to:

discard a first coefficient representing a highest-frequency horizontal detail from the set of horizontal frequency coefficients of the block of coefficients where the determination is made that the associated latitude is beyond a first threshold latitude defined by first and second threshold latitudes;

discard a second coefficient in addition to the first coefficient from the set of horizontal frequency coefficients where the determination is made that the associated latitude is within a latitude range defined by the first threshold latitude and a second threshold latitude; and discard the set of horizontal frequency coefficients where the determination is made that the associated latitude is beyond a third threshold latitude.

12. The system of claim 11, the third threshold latitude is closer to the pole than the first and second threshold latitudes and the first threshold latitude is the furthest from the pole relative to the second and third threshold latitudes.

13. The system of claim 11, the instructions further comprising instructions to:

preserve a constant coefficient in the block coefficients, the constant coefficient representing an average determined using each coefficient in the block of coefficients generated by the transformation of the block of pixels.

14. The system of claim 13, the instructions to discard the set of horizontal frequency coefficients where the determination is made that the associated latitude is beyond the third threshold latitude further comprising instructions to:

discard each coefficient of the block of coefficients except the constant coefficient.

15. The system of claim 10, the instructions further comprising instructions to:

provide the block of coefficients comprising the set of horizontal frequency coefficients to one or more of quantization and encoding of the block of coefficients, any coefficient discarded from the set of horizontal coefficients being set to zero in the block of coefficients.

16. The system of claim 10, the instructions to use are performed prior to performing a transformation of the block of pixels to generate the block of coefficients, such that the transformation comprises transformation of coefficients other than discarded coefficients.

17. The system of claim 10, the instructions to use are performed after performing the transformation of the block of pixels to generate the block of coefficients.

18. The system of claim 10, the spherical image comprising an image that is to be projected onto a sphere using a rectangular projection.

19. A computer readable non-transitory storage medium for tangibly storing thereon computer readable instructions that when executed cause at least one processor to:

identify a block of coefficients of a plurality of coefficient blocks generated from a plurality of pixels of a spherical image, the block of coefficients corresponding to a block of pixels of the plurality of pixels and comprising a set of horizontal frequency coefficients;

determine a latitude associated with the set of horizontal frequency coefficients, the set of coefficients representing varying levels of horizontal detail; and use the associated latitude to make a determination whether to discard one or more of the coefficients of the block, an identification of a number of coefficients to discard is a function of the associated latitude such that the number increases as the associated latitude's approaches the pole.

20. The computer readable non-transitory storage medium of claim 19, the instructions to use the associated latitude to make a determination whether or not to discard one or more of the coefficients further comprising instructions to:

discard a first coefficient representing a highest-frequency horizontal detail from the set of horizontal frequency coefficients of the block of coefficients where the determination is made that the associated latitude is beyond a first threshold latitude defined by first and second threshold latitudes;

discard a second coefficient in addition to the first coefficient from the set of horizontal frequency coefficients where the determination is made that the associated latitude is within a latitude range defined by the first threshold latitude and a second threshold latitude; and discard the set of horizontal frequency coefficients where the determination is made that the associated latitude is beyond a third threshold latitude.

21. The computer readable non-transitory storage medium of claim 20, the third threshold latitude is closer to the pole than the first and second threshold latitudes and the first threshold latitude is the furthest from the pole relative to the second and third threshold latitudes.

22. The computer readable non-transitory storage medium of claim 20, the instructions further comprising instructions to:

preserve a constant coefficient in the block coefficients, the constant coefficient representing an average determined using each coefficient in the block of coefficients generated by the transformation of the block of pixels.

23. The computer readable non-transitory storage medium of claim 22, the instructions to discard the set of horizontal frequency coefficients where the determination is made that the associated latitude is beyond the third threshold latitude further comprising instructions to:

discard each coefficient of the block of coefficients except the constant coefficient.

24. The computer readable non-transitory storage medium of claim 19, the instructions further comprising instructions to:

provide the block of coefficients comprising the set of horizontal frequency coefficients to one or more of quantization and encoding of the block of coefficients, any coefficient discarded from the set of horizontal coefficients being set to zero in the block of coefficients.

25. The computer readable non-transitory storage medium of claim 19, the instructions to use are performed prior to performing a transformation of the block of pixels to generate the block of coefficients, such that the transformation comprises transformation of coefficients other than discarded coefficients.

26. The computer readable non-transitory storage medium of claim 19, the instructions to use are performed after performing the transformation of the block of pixels to generate the block of coefficients.

27. The computer readable non-transitory storage medium of claim 19, the spherical image comprising an image that is to be projected onto a sphere using a rectangular projection.

\* \* \* \* \*